United States Patent [19]
Johnson et al.

[11] Patent Number: 5,748,255
[45] Date of Patent: May 5, 1998

[54] INTERFACE SYSTEM FOR A TELEVISION RECEIVER

[75] Inventors: Larry D. Johnson; Joseph W. Memory, Jr.; Anthony F. Prudic, all of Knoxville, Tenn.

[73] Assignee: Philips Electronics North America Corporation, New York, N.Y.

[21] Appl. No.: 931,061

[22] Filed: Sep. 15, 1997

Related U.S. Application Data

[63] Continuation of Ser. No. 777,368, Dec. 27, 1996, abandoned, which is a continuation-in-part of Ser. No. 362,037, Dec. 22, 1994, Pat. No. 5,592,234.

[51] Int. Cl.$^6$ .................................................. H04N 5/44
[52] U.S. Cl. ..................... 348/553; 348/725; 348/571; 348/552; 379/90
[58] Field of Search .................................. 348/552, 553, 348/565, 571, 718, 719, 725, 836, 843, 544; 379/142, 90.01; H04N 5/44

[56] References Cited

U.S. PATENT DOCUMENTS

| | | | |
|---|---|---|---|
| 4,337,480 | 6/1982 | Bourassin et al. | 358/93 |
| 4,649,428 | 3/1987 | Jones et al. | 358/188 |
| 4,789,860 | 12/1988 | Brennnand et al. | 340/825.51 |
| 5,274,455 | 12/1993 | Nishide et al. | 358/188 |
| 5,283,638 | 2/1994 | Engberg et al. | 348/14 |
| 5,359,367 | 10/1994 | Stockill | 348/552 |
| 5,404,393 | 4/1995 | Remillard | 379/96 |
| 5,621,482 | 4/1997 | Gardner et al. | 348/725 |

Primary Examiner—Glenton B. Burgess
Attorney, Agent, or Firm—Edward W. Goodman

[57] ABSTRACT

An interface system for a television receiver includes an interface connector having a plurality contacts connected to various component circuits in the television receiver. In order to provide various functions for the television receiver, the interface system includes various circuit boards each having a plug connectable with the interface connector. The plug includes a number of contacts equal to or less than the plurality of contacts in the interface connector. Depending on the desired function, the circuit board further includes circuits for providing the function, these circuits being interconnected and connected to the appropriate contacts in the plug for connecting with the appropriate component circuits in the television receiver. The interface system allows the television receiver functions to be modified and/or updated without the need for opening the television and modifying the circuits and/or the wiring to the circuits.

10 Claims, 2 Drawing Sheets

INTERFACE SYSTEM FOR A TELEVISION RECEIVER

CROSS-REFERENCE TO RELATED APPLICATIONS

This is a continuation of application Ser. No. 08/777,368, filed Dec. 27,1996, now abandon, which is a continuation-in-part application to U.S. patent application Ser. No. 08/362,037, filed Dec. 22, 1994, now U.S. Pat. No. 5,592,234.

BACKGROUND OF THE INVENTION

1. Field of the Invention

The subject invention relates to television receivers and the various functionality options now available to a user.

2. Description of the Related Art

Television receivers that are being marketed today have various optional functions which may be incorporated therein. For example, the television receiver may include Picture-in-Picture (PIP) in which the video signal for PIP is provided by a second signal source (a VCR) connected to a second video input of the television receiver, or a second tuner so that the television receiver may by itself provide PIP. These and other optional features are provided by modifying the circuitry inside the television receiver. Quite naturally, these changes must be implemented in the production line resulting in a plurality of different models of the television receiver being fabricated. It should be apparent that this results in relatively high production costs. In marketing these separate models of television receivers, a dealer must then anticipate what features his/her customers would desire, and order sufficient quantities of the specific models. Any others must be ordered specifically for that consumer which may result in a lost sale.

In another situation, unless the particular model of television receiver in the user's possession has the appropriate features, the user must open up the television receiver, and cut into existing wiring so that the user may be able to adapt the television receiver for use with, for example, a computer.

One of the more interesting things in today's world is the availability of information to virtually anyone. This information is accessible through the Internet, or Worldwide Web. At present, the only way one may access the Internet is through a personal computer with appropriate programming and a modem by which the user of the personal computer may access the Internet via a telephone connection. However, the computing powers of the personal computer are largely not used in this situation, the user merely requiring the programming contained in the personal computer to allow the user to "browse" the Internet.

SUMMARY OF THE INVENTION

It is an object of the present invention to devise a standard television receiver which is easily adaptable for different functionalities.

It is a further object of the present invention to provide a standard television receiver in which the different functionalities may be adapted without opening the television receiver and physically modifying the circuitry therein.

It is another object of the present invention to provide a standard television receiver in which the different functionalities may be adapted to allow a user access to the Internet without opening the television receiver and physically modifying the circuitry therein.

The above objects are achieved in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises standard bus means having M leads separately connected to said audio signal processing circuit, said deflection circuit, said video signal processing circuit and said power supply circuit, where M is an integer greater than one; connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus includes leads connected to said remote control receiver and to said microcomputer, characterized in that said circuit means on said circuit board means comprises a telephone line interface connector for connecting the circuit board means to a telephone line; a modem for receiving incoming signals from said telephone line and for sending outgoing signals to said telephone line; a further microcomputer coupled to said modem for generating said outgoing signals and for processing said incoming signals, said further microcomputer having a first memory connected thereto having stored therein an operating program, and a second memory connected thereto for temporarily storing data signals; and audio/video signal generating means coupled to said further microcomputer for generating audio and video signals at least in part from said data signals stored in said second memory and from said received incoming signals; wherein said further microcomputer is connected to said microcomputer and to said remote control receiver via said plug means and said connector means, and said audio/video signal generating means is connected to said audio signal processing circuit and said video signal processing circuit via said plug means and said connector means, whereby said audio/video signal generating means alternatively supplies video signals for said video signal processing circuit and audio signals for said audio signal processing circuit under control of said further microcomputer which, in turn, is controlled by remote control signals received by said remote control receiver from said remote control transmitter.

3

As shown in FIG. 1, the interface system of the subject invention allows a television receiver to be modified and/or upgraded to various different functionalities including, for example: CD-Video, Internet, television/computer interface, ghost cancellation, dual tuner PIP, digital compressed video cable interface, hotel/motel/hospital pay-per-view system, etc., just by plugging the appropriate circuit board into the interface connector.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 2:
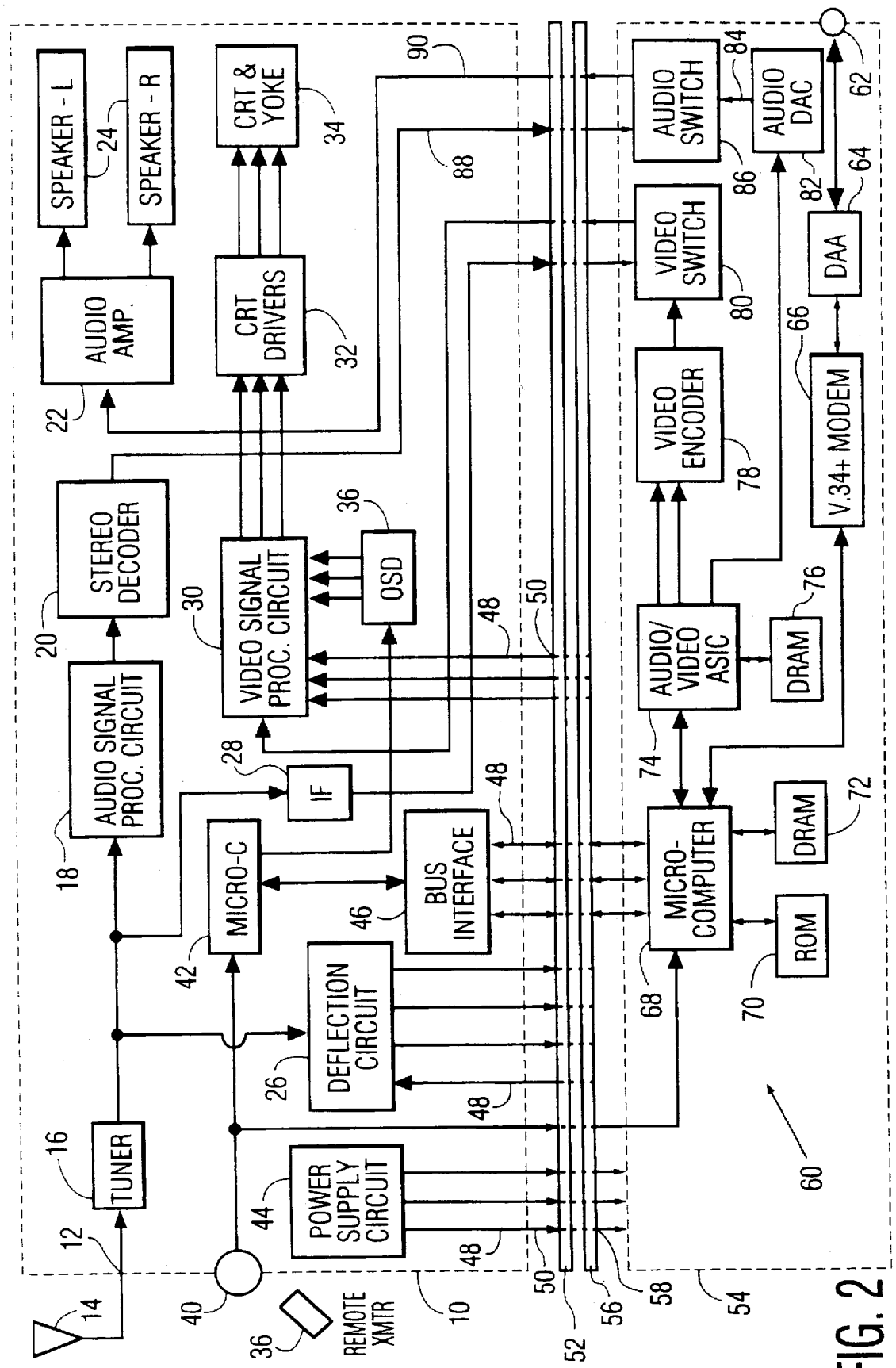
FIG. 2 shows, in block diagram form, a standard television receiver, in which the interface system is used to enable a user of the television receiver to interactively communicate on the Internet.

FIG. 2 shows a standard television receiver 10 having an input 12 for receiving television signals from, for example, an antenna 14. The input 12 is connected to a tuner 16 for tuning the television receiver 10 to a particular television signal. The output from the tuner 16 is connected to an audio signal processing circuit 18 which separates an audio signal from the received television signal. An output from the audio signal processing circuit 18 is connected to a stereo decoder 20 which decodes the audio signal into separate left and right audio signals. A stereo audio amplifier 22 is shown which amplifies left and right audio signals for application to a left and a right speaker 24. The output from the tuner 16 is also applied to a deflection circuit 26 for generating deflection signals from synchronization signals contained in the television signal, and to an intermediate frequency stage (IF) 28 which converts the received television signal to a baseband CVBS signal. A video signal processing circuit 30 is provided for processing a baseband CVBS signal into component color signals (RGB) for application to cathode ray tube (crt) driver circuits 32 for driving a crt 34, which also receives the deflection signals from the deflection circuit 26. The video signal processing circuit 30 has an on-screen display circuit 36 connected thereto for providing video signals indicating messages for display on the crt 34. As noted in FIG. 2, an infrared remote control transmitter 38 is shown for interaction with a remote control receiver 40 in the television receiver 10. A microcomputer 42 is also shown connected to the remote control receiver 40 and controls the operation of the other elements in the television receiver 10, and in particular, the on-screen display circuit 36, in part, based on signals received by the remote control receiver 40. Finally, a power supply circuit 44 is shown which provides operating power to each of the above circuits. It should be noted that the connecting lines between these components have been omitted for clarity, any one skilled in the art would know how each of these circuits would be connected to the power supply circuit 44.

The subject invention includes the provision of a bus interface 46 in the television receiver 10 which is connected to the microcomputer 42, and a standard bus having lines 48 connected to each of the above-noted components, and in particular, the power supply circuit 44, the remote control receiver 40, the deflection circuit 26, the bus interface 46, the video signal processing circuit 30, the IF 28, the stereo decoder 20 and the stereo audio amplifier 22. These lines 48 are then connected to contacts 50 in an interface connector 52. A circuit board 54 is then provided with a plug 56 having contacts 58 for engaging with the contacts 50 in the interface connector 52. In particular, depending on the functionalities to be offered by the particular circuit board 54, various ones of the contacts 58 in the plug 56 are connected to circuits 60 mounted on the circuit board 54.

In the embodiment shown in FIG. 2, the circuits 60 on circuit board 54 enable a user of the television receiver to interactively communicate on the Internet. In particular, the circuits 60 include a telephone interface connector 62 for connecting the circuit board 54 to a telephone line, a direct access arrangement (DAA) 64 bi-directionally connected to the telephone interface connector 62, a modem 66, which may be a V.34+ type, bi-directionally connected to the DAA 64, and a microcomputer 68 bi-directionally connected to the modem 66. The DAA 64 is an interface between the telephone line (Tip & Ring) and the modem and provides line monitoring (such as off-hook, etc.), filtering, isolation, protection and signal conversion (2-to-4 wire conversion). The DAA may be in accordance with FCC part 68. The microcomputer 68 has a ROM memory 70 and a DRAM memory 72 connected thereto. An output from the microcomputer 68 is coupled to an audio/video ASIC 74 having a DRAM 76 connected thereto. The audio/video ASIC 74, which has a first output carrying luminance and chrominance signals, and a second output carrying synchronizing signals, both connected to a video encoder 78, provides the functions: (1) VGA-like graphics to create Web pages (consisting of text and graphics; (2) non-interlace to interlace video conversion to remove line flicker and reduce the VGA image to fit a television screen; (3) MIDI (Musical Instrument Digital Interface) sound synthesis to allow playing of MIDI files; (4) playback of audio wave files; and (5) other functions which may be required to improve the response time to the Web. An output from the video encoder 78 carrying a CVBS signal is connected to one input of a video switch 80. The audio/video ASIC 74 further includes a third output carrying audio signals which is connected to an audio digital-to-analog converter (DAC) 82 having stereo outputs (line 84) connected to a first set of inputs of an audio switch 86.

The contacts 58 of the plug 56 connected to the power supply 44 are connected to the circuits 60 on the circuit board 54. In addition, the contact 58 connected to the output of the remote control receiver 40 is connected to an input of the micro-computer 68, which is connected through the contacts 58 to the bus interface 46. A second input of the video switch 80 is connected through the contacts 58 to the output from the IF 28 and an output from the video switch 80 is connected through the contacts 58 to the video signal processing circuit 30. Finally, a second set of inputs of the audio switch 86 are connected through the contacts 58 to the output of the stereo decoder 20 (via line 88), while outputs of the audio switch 86 are connected through the contacts 58 to the input of the stereo audio amplifier 22 via line 90.

The television receiver 10 having circuit board 54 connected thereto operates as follows. When the user wants to access the Internet, using the remote control transmitter 38, the user causes the microcomputer 42 in the television receiver 10 to activate the microcomputer 68 on the circuit board 54. Based on the programming in ROM 70, the microcomputer 68 sends a signal through the modem 66, DAA 64 and telephone line interface plug 62 effectively dialling to the appropriate Internet service and requesting service. Once a connection is established, the microcomputer 68 sends appropriate signals to the audio/video ASIC 74 which causes the video encoder 78 to generate a composite video signal. Video switch 80, under control of microcomputer 68 then applies this composite video signal to the input of the video signal processing circuit. Similarly, the audio signal from the audio/video ASIC 74 is processed by the audio DAC 82 into stereo signals which, via the audio switch 86 under control of the microcomputer 68, are applied to the stereo inputs of the audio amplifier 22. The microcomputer 68 is now controlled by the remote control transmitter 38 through, for example, menus generated by the microcomputer 68 and displayed on the crt 34.

Figure 1:
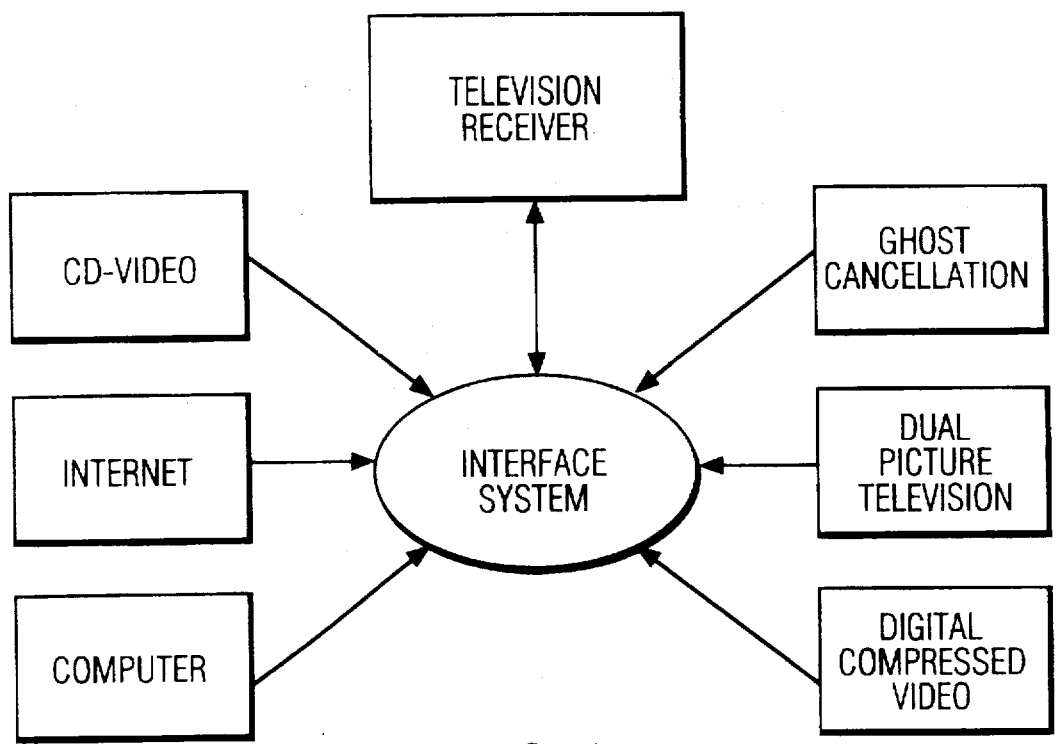
FIG. 1 shows the various different applications for the interface system of the subject invention.
Figure 3:
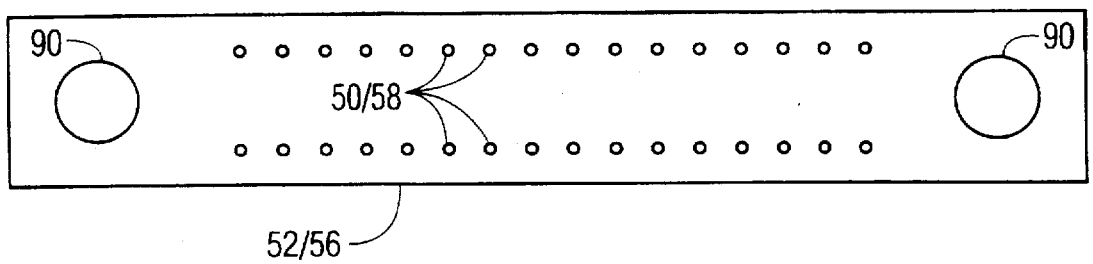
FIG. 3 shows an interface connector for use in the interface system.

FIG. 3 shows and example of an interface connector/plug 22/56. In particular, the interface connector 52 and mating plug 56 are 32-pin mating connectors in which the pins are arranged in two rows. The connectors/plugs include through-holes 90 into which fastening means (not shown) are used to secure the plug 56 to the connector 52. In a preferred embodiment of the invention, the contacts 50 on the connector 52 are connected to the various circuits in the television receiver as shown in Table 1:

TABLE 1

| PIN 1 | −13 VDC | PIN 17 | BLUE ANALOG IN |
|---|---|---|---|
| PIN 2 | GROUND | PIN 18 | GREEN ANALOG IN |
| PIN 3 | +13 VDC | PIN 19 | RED ANALOG IN |
| PIN 4 | CHASSIS GND(EX-μC) | PIN 20 | SAND CASTLE OUT |
| PIN 5 | IR DATA IN | PIN 21 | L AUDIO IN |
| PIN 6 | IR DATA OUT | PIN 22 | R AUDIO IN |
| PIN 7 | INTERFACE CLOCK | PIN 23 | AUDIO OUT - LOW |
| PIN 8 | INTERFACE DATA IN | PIN 24 | L AUDIO OUT |
| PIN 9 | INTERFACE DATA OUT | PIN 25 | R AUDIO OUT |
| PIN 10 | BEAM LIMITER OUT | PIN 26 | N/A |
| PIN 11 | HOR. BLANK OUT | PIN 27 | AUDIO OUT |
| PIN 12 | VERT. BLANK OUT | PIN 28 | N/A |
| PIN 13 | CHASSIS VIDEO GND | PIN 29 | AUDIO IN - LOW |
| PIN 14 | CVBS IN | PIN 30 | FAST BLANKING IN |
| PIN 15 | CVBS OUT | PIN 31 | GREEN TTL IN |
| PIN 16 | RED TTL IN | PIN 32 | RED TTL IN |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus includes leads connected to said remote control receiver and to said microcomputer, characterized in that said circuit means on said circuit board means comprises:

a telephone line interface connector for connecting the circuit board means to a telephone line;

a modem for receiving incoming signals from said telephone line and for sending outgoing signals to said telephone line;

a further microcomputer coupled to said modem for generating said outgoing signals and for processing said incoming signals, said further microcomputer having a first memory connected thereto having stored therein an operating program, and a second memory connected thereto for temporarily storing data signals; and audio/video signal generating means coupled to said further microcomputer for generating audio and video signals at least in part from said data signals stored in said second memory and from said received incoming signals;

wherein said further microcomputer is connected to said microcomputer and to said remote control receiver via said plug means and said connector means, and said audio/video signal generating means is connected to said audio signal processing circuit and said video signal processing circuit via said plug means and said connector means, whereby said audio/video signal generating means alternatively supplies video signals for said video signal processing circuit and audio signals for said audio signal processing circuit under control of said further microcomputer which, in turn, is controlled by remote control signals received by said remote control receiver from said remote control transmitter.

2. An interface system as claimed in claim 1, wherein said video signal processing circuit includes an IF stage coupled to the output of said tuner for generating a composite video signal, and a video signal processor having an input for receiving a composite video signal and outputs for providing color signals, an output of said IF stage and the input of said video signal processor being connected to said connector means via said standard bus means, characterized in that said audio/video signal generating circuit comprises:

an audio/video ASIC for separately generating luminance/chrominance signals and a synchronizing signal;

a video encoder for receiving the luminance/chrominance signals and the synchronizing signal, said video encoder having an output for providing a composite video signal; and a video switch having a first input coupled to the output of the video encoder, a second input coupled the output of said IF stage via said plug means and said connector means, and an output coupled to said input of said video signal processor via said plug means and said connector means, whereby said further microcomputer selectively causes said video switch to connect the composite video signal generated by the video encoder to the input of the video signal processor.

3. An interface system as claimed in claim 2, wherein said audio signal processing circuit includes a stereo decoder for forming stereo signals, and a stereo audio amplifier having inputs for receiving stereo signals, outputs of said stereo decoder and input of said stereo audio amplifier being connected to said connector means via said standard bus means, and wherein said audio/video ASIC further generates a separate audio signal, characterized in that said audio/video signal generating circuit further comprises:

an audio CODEC coupled to said audio/video ASIC for generating stereo signals; and an audio switch having a first input set coupled to outputs of said audio CODEC, a second input set coupled to outputs of said stereo decoder via said plug means and said connector means, and an output set coupled to the inputs of said stereo audio amplifier via said plug means and said connector means, whereby said further microcomputer selectively causes said audio switch to connect the stereo signals from said audio CODEC to the stereo inputs of said stereo audio amplifier.

4. An interface system as claimed in claim 1, wherein said audio/video signal generating means generates discrete color signals which are applied to said video signal processing circuit via said plug means and said connector means, said microcomputer in said television receiver selectively causing said video signal processing circuit to select the discrete color signals generated by said audio/video signal generating means for processing.

5. An interface system as claimed in claim 1, wherein said audio/video signal generating means generates an encoded audio signal which is applied to said audio signal processing circuit via said plug means and said connector means, said microcomputer in said television receiver selectively causing said audio signal processing circuit to select the encoded audio signal for processing.

6. Circuit board means for use in a television interface system, said television interface system comprising a television receiver and said circuit board means accessible by a user of said television receiver for connection to said television receiver, said television receiver comprising a tuner for receiving and selectively tuning to a television signal; a deflection circuit coupled to said tuner for generating deflection signals from synchronization signals contained in said television signal; an audio signal processing circuit coupled to said tuner for processing an audio signal contained in said television signal; a video signal processing circuit coupled to said tuner for processing a video signal contained in said television signal; a display coupled to said deflection circuit and said video signal processing circuit for displaying said video signal in dependence on said deflection signals; a power supply circuit for supplying operating power to each of the above components; a remote control receiver for receiving remote control signals from a remote control transmitter; a microcomputer for controlling said television receiver at least partly in response to signals from said remote control receiver; standard bus means having M leads separately connected to said audio signal processing circuit, said deflection circuit, said video signal processing circuit, said remote control receiver, said microcomputer and said power supply circuit, where M is an integer greater than one; and connector means having M contacts connected, respectively, to said M leads in said standard bus means, characterized in that said circuit board means comprises:

plug means connectable to said connector means, said plug means having N contacts corresponding, respectively, to at least some of the M contacts in said connector means; and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said circuit means comprises:

a telephone line interface connector for connecting the circuit board means to a telephone line;

a modem for receiving incoming signals from said telephone line and for sending outgoing signals to said telephone line;

a further microcomputer coupled to said modem for generating said outgoing signals and for processing said incoming signals, said further microcomputer having a first memory connected thereto having stored therein an operating program, and a second memory connected thereto for temporarily storing data signals; and audio/video signal generating means coupled to said further microcomputer for generating audio and video signals at least in part from said data signals stored in said second memory and from said received incoming signals;

wherein said further microcomputer is connected to said microcomputer and to said remote control receiver via said plug means and said connector means, and said audio/video signal generating means is connected to said audio signal processing circuit and said video signal processing circuit via said plug means and said connector means, whereby said audio/video signal generating means alternatively supplies video signals for said video signal processing circuit and audio signals for said audio signal processing circuit under control of said further microcomputer which, in turn, is controlled by remote control signals received by said remote control receiver from said remote control transmitter.

7. Circuit board means as claimed in claim 6, wherein, in said television receiver, said video signal processing circuit includes an IF stage coupled to the output of said tuner for generating a composite video signal, and a video signal processor having an input for receiving a composite video signal and outputs for providing color signals, an output of said IF stage and the input of said video signal processor being connected to said connector means via said standard bus means, characterized in that said audio/video signal generating circuit comprises:

an audio/video ASIC for separately generating luminance/chrominance signals and a synchronizing signal;

a video encoder for receiving the luminance/chrominance signals and the synchronizing signal, said video encoder having an output for providing a composite video signal; and a video switch having a first input coupled to the output of the video encoder, a s second input coupled the output of said IF stage via said plug means and said connector means, and an output coupled to said input of said video signal processor via said plug means and said connector means, whereby said further microcomputer selectively causes said video switch to connect the composite video signal generated by the video encoder to the input of the video signal processor.

8. Circuit board means as claimed in claim 7, wherein, in said television receiver, said audio signal processing circuit includes a stereo decoder for forming stereo signals, and a stereo audio amplifier having inputs for receiving stereo signals, outputs of said stereo decoder and input of said stereo audio amplifier being connected to said connector means via said standard bus means, and wherein said audio/video ASIC further generates a separate audio signal, characterized in that said audio /video signal generating circuit further comprises:

an audio CODEC coupled to said audio/video ASIC for generating stereo signals; and an audio switch having a first input set coupled to outputs of said audio CODEC, a second input set coupled to outputs of said stereo decoder via said plug means and said connector means, and an output set coupled to the inputs of said stereo audio amplifier via said plug means and said connector means, whereby said further microcomputer selectively causes said audio switch to connect the stereo signals from said audio CODEC to the stereo inputs of said stereo audio amplifier.

9. Circuit board means as claimed in claim 6, wherein said audio/video signal generating means generates discrete color signals which are applicable to said video signal processing circuit via said plug means and said connector means, said microcomputer in said television receiver selectively causing said video signal processing circuit to select the discrete color signals generated by said audio/video signal generating means for processing.

10. Circuit board means as claimed in claim 6, wherein said audio/video signal generating means generates an encoded audio signal which is applicable to said audio signal processing circuit via said plug means and said connector means, said microcomputer in said television receiver selectively causing said audio signal processing circuit to select the encoded audio signal for processing.

* * * * *